(12) United States Patent
Bullock

(10) Patent No.: US 6,896,459 B1
(45) Date of Patent: May 24, 2005

(54) MONOLITHIC CARGO RESTRAINT SYSTEM AND METHOD

(76) Inventor: Matthew Bullock, 4509 N. 7th St., Arlington, VA (US) 22203

( * ) Notice: Subject to any disclaimer, the term of this patent is extended or adjusted under 35 U.S.C. 154(b) by 0 days.

(21) Appl. No.: 10/730,025

(22) Filed: Dec. 9, 2003

(51) Int. Cl.[7] .................................................. B60P 7/08
(52) U.S. Cl. ............................ 410/97; 410/34; 410/100
(58) Field of Search .............................. 410/32, 34, 36, 410/42, 96, 97, 100, 155; 53/399, 441, 462, 566; 206/410, 597; 220/1.5; 248/499

(56) References Cited

U.S. PATENT DOCUMENTS

| | | | |
|---|---|---|---|
| 4,054,226 A | * | 10/1977 | Bjelland et al. ............. 220/1.6 |
| 4,264,251 A | * | 4/1981 | Blatt .......................... 410/100 |
| 4,640,853 A | * | 2/1987 | Schmeal et al. ........... 428/34.2 |
| 4,846,610 A | * | 7/1989 | Schoenleben ................ 410/96 |
| 5,431,284 A | * | 7/1995 | Wilson ....................... 206/597 |
| 5,595,315 A | * | 1/1997 | Podd et al. .................. 220/1.5 |
| 6,089,802 A | * | 7/2000 | Bullock ....................... 410/97 |
| 6,227,779 B1 | * | 5/2001 | Bullock ....................... 410/98 |
| 6,368,036 B1 | * | 4/2002 | Vario .......................... 410/98 |
| 6,607,337 B1 | * | 8/2003 | Bullock ....................... 410/97 |
| 6,758,644 B1 | * | 7/2004 | Vick ........................... 410/100 |

* cited by examiner

*Primary Examiner*—D. Glenn Dayoan
*Assistant Examiner*—Paul Chenevert
(74) *Attorney, Agent, or Firm*—Bradford E. Kile; Kile, Goeksian Reed & McManus PLLC

(57) ABSTRACT

A monolithic load restraint system and method for securing cargo within transport containers including first and second monolithic, flexible strips, a first intermediate layer of adhesive and a second layer of adhesive for attachment to a transport container interior surface.

20 Claims, 4 Drawing Sheets

MONOLITHIC CARGO RESTRAINT SYSTEM AND METHOD

RELATED PATENTS

This application relates to U.S. Pat. No. 6,089,802 entitled "Cargo Restraint System for a Transport Container" issued on Jul. 18, 2000, U.S. Pat. No. 6,227,779 entitled "Cargo Restraint Method for a Transport Container" issued on May 8, 2001, and U.S. Pat. No. 6,607,337 entitled "Cargo Restraint System" issued on Aug. 19, 2003, all of common inventorship and assignment as the subject application.

BACKGROUND OF THE INVENTION

This invention relates to an improved system and method for restraining cargo during transportation. More particularly, this invention relates to a novel system and method for securing and restraining undesired movement of drums, boxes, rigid and flexible containers, palletized or not palletized, within the interior of a truck body, a railroad car, an intermodal container, and the like. Moreover this invention relates to a system and method of enhanced securement strength, reduction of load shifting during transport, and ease and convenience of manufacture.

In the United States most overland shipping is accomplished using either a tractor/trailer truck combination, often referred to descriptively as an eighteen wheeler, or via railroad boxcars and/or truck trailers mounted on flatcars. Truck trailers are typically forty five, forty eight or fifty three feet in length and are often loaded with cargo in containment enclosures such as fifty five gallon closed head drums, super sacks or plastic reinforced bags, plastic; wrapped bundles, cased goods, metal coils, specialty heavy paper rolls, plastic or metal containers mounted on pallets, and the like. Although each containment enclosure or bundle may be quite heavy and stationary at rest, the mass of a transport load can produce considerable momentum force as a truck or rail car is placed in motion.

Rail cars may be made up by a coupling or humping process within a switching yard. When a railroad car is rolled into a stationary string of cars, the impact causes the car couplings to lock together with a jolt. This impact can apply a significant force to cargo within the rail car. Moreover, during transport, railway cars are subject to braking forces, run-in and run-out coupler impact over grades, rail vibration, dips in the track, and swaying. In a similar manner trucks are subject to stopping and starting forces, emergency braking, bumps and swaying from uneven road beds, centrifugal forces on curves, vibration, etc. which tend to shift loads.

In addition to the above discussed overland shipping, most shipments for export, both in the United States and abroad, are placed into intermodal containers. These containers have standardized dimensions of twenty or forty feet in length and are fabricated with steel, corrugated sidewalls which are structurally self-supporting and rugged. Several intermodal containers may; be stacked on top of each other for transport by sea, rail, or road. Within the containers, drums, boxes, etc. hold actual product as noted above.

The cargo of these intermodal containers experience various forces throughout the course of transport as noted above in connection with overland transport, such as, acceleration, centrifugal loads, braking, vibration, etc. as noted above. In addition, intermodal containers, when loaded onto ships for ocean transport, are subjected to wave forces including: yaw, pitch, heave, sway, and surge. Each of these forces has the potential to impart a substantial force on the contents within an intermodal container. In this, when a container changes direction or speed, cargo within the container tends to continue along the previously existing path until it contacts an interior wall of the container. Without some type of restraint and/or cushioning system, the cargo builds up considerable momentum, independent of the container. The amount of momentum is equal to the mass of a load multiplied by its velocity. In the case of large cargo loads, even a small change in velocity or direction can generate substantial forces.

When cargo contacts the interior walls or doors of a container, the force necessary to reduce its momentum to zero must be absorbed by the goods and/or the container. Such forces can result in damage to the cargo, damage to the interior walls or doors of the container, damage to the cargo packing, and may create dangerous leaks if the cargo is a hazardous material. Accordingly, it is undesirable to permit cargo to gain any momentum independent of a container during transport. This is accomplished by restraining the cargo within the container so that the cargo and the container are essentially united and operationally function as one object during transport.

In order to secure the load during transport and minimize undesired shifting and damage the load containment enclosures are often secured to the floor and/or sides of the trailer or boxcar by specially fabricated wood framing, floor blocking, rubber mats, steel strapping, heavy air bags, etc. Each of these previously known systems for securement have limitations associated with construction cost, lack of strength sufficient to secure dense loads, etc. Moreover, although rear doors of a trailer may be relied on to at least partially secure non-hazardous materials such as food-stuffs, tissue or soft paper products; furniture, appliances, etc., for hazardous materials, and many other types of loads, the rear doors of a container may not be used to even partially secure a load. In fact, in order to comply with Department of Transportation Regulations and Bureau of Explosives, hazardous materials are not even permitted to come in contact with rear doors during an impact.

Still further in some instances a trailer or boxcar may be used for shipping where only a partial load is carried. Moreover, a partial load might be positioned within a center location of a trailer. In this instance it may be impractical to construct wooden front and rear dunnage sufficient to secure a load where the front of the trailer is not utilized.

In the past, various dunnage materials have been utilized within; trailers and/or intermodal containers to eliminate unwanted movement or shifting of a load during transport. The drums, boxes, or other containers have; been restrained in several different ways. Primarily, cargo was stabilized by a method of load-locking and lumber bracing. This system involves strategically placing lumber between a load face and the rear doors of a container. This, however, can be a costly, time consuming, and generally inefficient means of securing a load. In this, the blocking process requires carpenters and is often outsourced to contractors. Moreover, wooden barriers can be time consuming to install. Further wood bracing can be somewhat brittle and subject to failure as a result of an abrupt impact.

In addition to the above, conventional methods of load-blocking with lumber bracing simply can not perform some tasks. For example, the most efficient means of filing an intermodal container is eighty, fifty-five gallon drums, double stacked in a twenty-foot long container. However, if eighty barrels are loaded there are only approximately four inches between the load face and rear doors of the container. Four inches is not enough space to put sufficient lumber to brace a load of eighty drums adequately. Consequently, when wood bracing is utilized as a system of restraint, shippers are forced to ship containers that are not filled to capacity. This reduces transport efficiency and increases transportation costs. Moreover, some types of wood, such as conifer woods which include evergreen, cone-bearing trees, such as pine, spruce, hemlock, or fir, are not acceptable to cross international boundaries without certification of special fumigation or heat treatment processing of conifer wood dunnage to prevent importation of pests. In this the International Plant Protection Convention ("IPPC") has issued "Guidelines for Regulating Wood Packaging Material in International Trade" having specific sections, requirements and limitations with respect to wood dunnage that has been accepted by numerous countries including the United States.

The Department of Transportation has established a standard to determine if a particular restraint system is capable of adequately securing hazardous cargo. In certain instances, conventional load-locking and lumber bracing has not received approval to ship hazardous cargo.

Other known means of restraint such as ropes, metal or plastic straps or stands and the like appearing in the past have tended to exhibit impaired performance and are often not functionally suitable to restrain loads under even moderate conditions. Consequently, a need exists for securing lading in truck trailers, boxcars, and intermodal containers that is functionally effective, cost-efficient, labor-efficient, and able to comply with Department of Transportation, Bureau of Explosives and/or the Association of American Railroads regulations. Still further a need exists for securement systems that have enhanced strength characteristics and limit lading travel within a container.

At least one method and apparatus for restraining cargo movement which overcomes some of the foregoing limitations is disclosed in U.S. Pat. No. 4,264,251, of common assignment with the subject application. The invention disclosed in that patent comprises sealing strips that are adhered to opposing sidewalls of a container, a strip of bracing material, and a joining mechanism are used to bind the ends of the strips together into a secure and taut restraint.

In the '251 patent, flexible securement strips are applied in a manner similar to hanging wallpaper, wherein an adhesive is applied onto a surface within a trailer where adhesion is desired. Then a retaining strip is applied to the adhesive. In addition to this requirement of a separate adhesive, systems appearing in the past sometimes encountered problems associated with weakness at the joints. At the juncture where the strips came together, an opportunity existed for slippage of the joined panels. Moreover, intermodal containers have corrugated walls as noted above. These corrugations make applying a restraining strip to a separate adhesive, which may not have an even application, substantially more difficult.

In addition to the restraining system disclosed in U.S. Pat. No. 4,264,251 other systems have been developed that provide enhanced operating characteristics and advantages, as discussed in the above identified U.S. Pat. Nos. 6,089, 802; 6,227,779 and 6,607,337 all of common inventorship and assignment as the subject application. The disclosures of these prior four patents, of common assignment as the subject application, are hereby incorporated by reference as though set forth at length.

Further to these prior systems of securing lading in truck trailers, railroad cars, and intermodal containers increasing attention has been placed on securing heavier and denser loads, including hazardous materials, without abandoning the advantages achieved by previously known commercial systems. Moreover, there is interest in decreasing the elastic and/or plastic elongation permitted with prior securing systems so that hazardous materials can be transported with enhanced efficiency. In this regard it would be desirable to utilize eighty, fifty fife gallon, drum loads within a conventional intermodal container. In this arrangement four steel drums need to be positioned next adjacent to the rear door of an intermodal container. In the past, issues have existed with respect to unacceptable travel of loads which may even come into contact with rear doors of the container during impact. As noted above, for hazardous loads, load contact with the rear doors is not acceptable by HazMat regulations.

In addition to the above, other restraining systems known in the past required multiple elements which were cumbersome to store, were arduous to install, and often required a degree of skilled labor. Systems using straps, nails, anchors, or bolts all require substantial storage space even when not in use. Furthermore, such systems increase the safety risk to the workers restraining the cargo. Still further such systems have often been unable to satisfy safety and travel limits imposed by regulatory bodies in various countries.

In addition to the above concerns, systems and procedures used in the past relying on accessories located within the cargo container often were not able to secure a partial load. That is, if the load does not extend to the front or rear of the container, such as a centrally located load, the necessary anchors may not be available in an area where they can be effectively used.

Systems that have addressed the strength and reduced travel concerns where composed of multiple components and/or materials and involved the utilization of reinforcing materials either in single or multiple layers. It would therefore be highly desirable to provide a securement system with enhanced strength and minimum elongation while being concomitantly relatively easy and efficient to manufacture.

The problems suggested in the preceding are not intended to be exhaustive but rather are among many which may tend to reduce the effectiveness of cargo restraining systems known in the past. Other noteworthy problems may also exist; however, those presented above should be sufficient to demonstrate that cargo-restraining systems appearing in the past will admit to worthwhile improvement.

OBJECTS AND SUMMARY OF THE INVENTION

Objects

It is a general object that the subject invention provide a novel system and method to secure a load within a truck trailer, boxcar, intermodal container, or the like, which will obviate or minimize problems and concomitantly achieve at least some of the desired aspects of lading securement of the type previously described.

It is another general object of the subject invention to judiciously protect cargo from damage during transport.

It is a specific object of the invention to provide a securement system and method for a tractor trailer, boxcar, intermodal container, and the like, with enhanced strength to restrain a load in position during impact and/or other transport forces while concomitantly being easy and economical to manufacture.

It is a related object of the invention to provide a securement system and method for a tractor trailer, boxcar, intermodal container, and the like, where the amount of load travel for a given level of impact is minimized.

It is another object of the subject invention to reduce the material and labor costs involved in securing lading within a trailer, boxcar, intermodal container, and the like.

It is yet another object of the subject invention to provide a system capable of restraining eighty, fifty-five gallon drums, double stacked, in a twenty foot intermodal container capable of receiving Department of Transportation and Bureau of Explosives approval.

It is a particular object of the subject invention to provide a method for securing cargo that is self-contained and may be installed quickly, reliably, and efficiently by relatively unskilled labor, even in intermodal containers having corrugated walls.

It is another object of the subject invention to provide for efficient and simple removal of the securing system from a trailer truck, boxcar, intermodal container, or the like, at a cargo destination.

It is still a further object of the subject invention to provide a system for restraining cargo that is able to withstand a wide range of temperatures and levels of humidity to enable effective use in a wide range of climates.

It is a further specific object of the invention to provide an enhanced securement system that does not rely on the addition of one or more layers of reinforcing fabric or strands that must be manufactured to uniform specifications.

BRIEF SUMMARY OF THE INVENTION

One preferred embodiment of the invention, which is intended to accomplish at least some of the foregoing objects, comprises a monolithic load restraining strip having a first monolithic, flexible, strip of material having a first side and a second side a second monolithic, flexible strip having a first side and a second side. A first layer of adhesive coextensively extends along and between the first and second monolithic strips and a second layer of adhesive extends along an outer surface of the second monolithic strip to releasable attach the composite monolithic load restraining strip and operably serves to bond the monolithic load restraining strip to an interior surface of a cargo transport container such as a truck trailer side wall, a railroad boxcar interior wall surface, an intermodal container interior wall, or the like.

A polyethylene coated release paper layer is applied on the outside surface of the second layer of adhesive and the release paper is removed on site so that an installer can facilely apply the monolithic load restraining strip to an interior wall surface of a container.

In use, a length of the monolithic load restraining strip, typically twelve feet with a five foot section of an added second adhesive layer, is cut from a reel and a five foot length of release paper is peeled away from the second layer of adhesive material. Next, the second adhesive layer is self-adhered to an interior surface of a transport container such as a tractor-trailer, boxcar, intermodal container, or the like.

An identical second monolithic strip is applied to an opposite location of the container in a mirror image posture and the free ends of the two; monolithic load restraining strips are wrapped around goods to be secured within the container. The ends of opposing strips are overlapped at a center; location around the load. A tensioning tool is then used to wind the two lapped ends together to draw the opposing monolithic load restraining strips taut around the load. A third, shorter piece of the monolithic strip material, is cut from a separate roll of patch material and its release paper is removed. This shorter patch strip is adhered to the exposed surfaces of the two monolithic load restraining strips at the joint. The shorter patch piece thus locks the strips in place and forms a secure load restraining system.

THE DRAWINGS

Other objects and advantages of the present invention will become apparent from the following detailed description of preferred embodiments taken in conjunction with the accompanying drawings wherein.

DETAILED DESCRIPTION

Context of the invention

Figure 1:
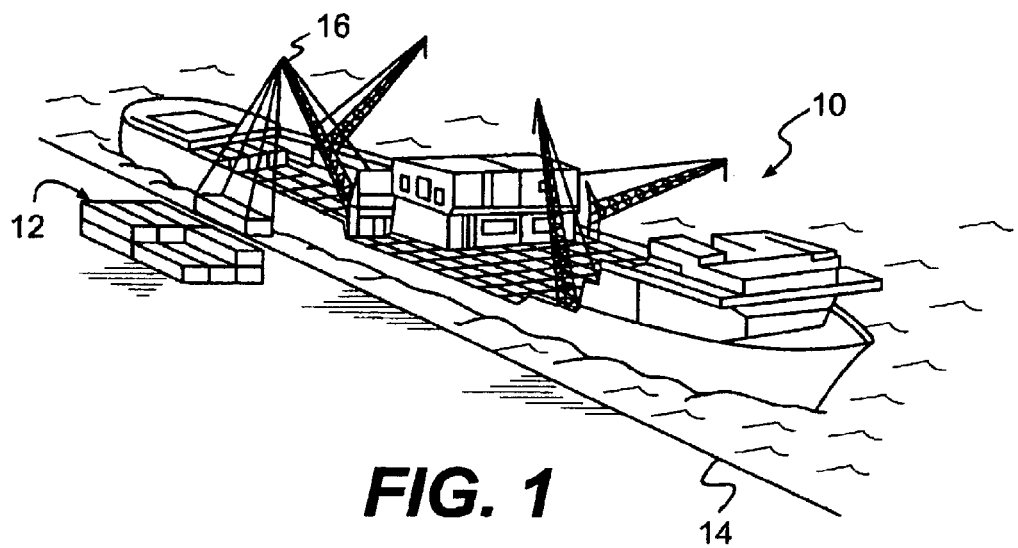
FIG. 1 is an aerial view of a ship at a dock with cranes lifting and loading intermodal containers onto the ocean going vessel.

Referring now particularly to FIG. 1, there is shown one operative context of the subject invention. In this, a ship 10 is shown docked at a port and intermodal containers 12 are being loaded onto the ship. Specifically, FIG. 1 depicts the ship 10 at a dock 14 and cranes 16 are lifting and loading the intermodal containers 12 to be stacked on the ocean going vessel 10. The subject invention may be advantageously used to secure cargo within the intermodal containers 12, like the ones being loaded onto the ship 10.

Figure 2:
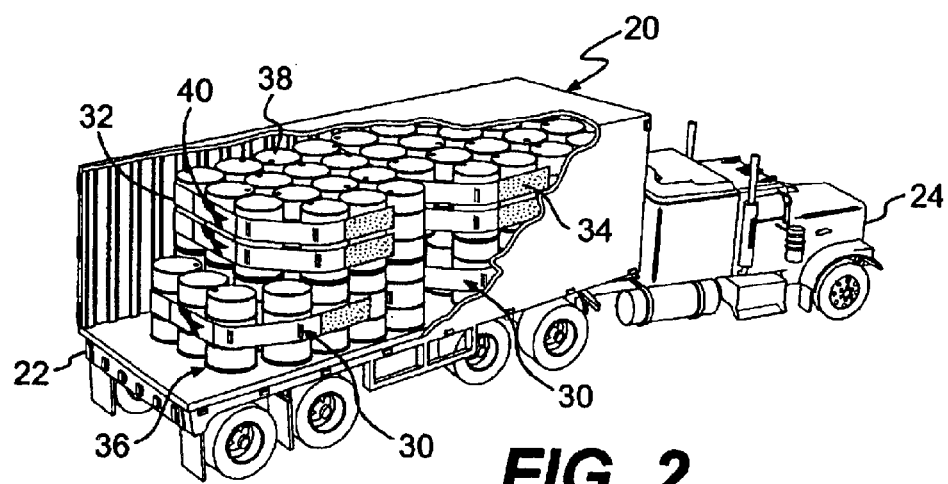
FIG. 2 is an axonometric view showing the interior of a truck trailer, or an intermodal container secured to a flatbed truck, with a partial load secured within the container.

FIG. 2 is an axonometric view that discloses the invention in another illustrative operating environment. In this view an intermodal or cargo container 20 is shown mounted upon a trailer 22 which is operably towed by a tractor 24 for land transport. Containers such as these are also operable to be mounted on railway flat cars either directly or attached to trailers 22. Other environments in which the subject invention is equally suitable for use includes railroad boxcars, and the like, not shown.

A partially cut away portion of FIG. 2 depicts a monolithic cargo restraining strip 30, in accordance with the invention, which is operable to be self-adhered to an interior wall surface 32 of the cargo container 20. The monolithic cargo restraining or securement system of the subject invention comprises a pair of opposing restraining strips 30 adhered to the side walls of the container 20 by the use of adhesive segments 34 that self adhere to opposing portions of the container side walls. The restraining strips 30 then extend to be wrapped around and embrace cargo 36, such as fifty five gallon drums 38. The restraining strips 30 overlap and are folded and drawn tightly together by a torque tool. Then an independent overlying patch segment 40 is applied to the junction to unite the opposing restraining strips 30 from the container side walls around the cargo to secure the cargo to the interior wall surfaces of the container 20.

Monolithic Restraining Strip

Figure 3:
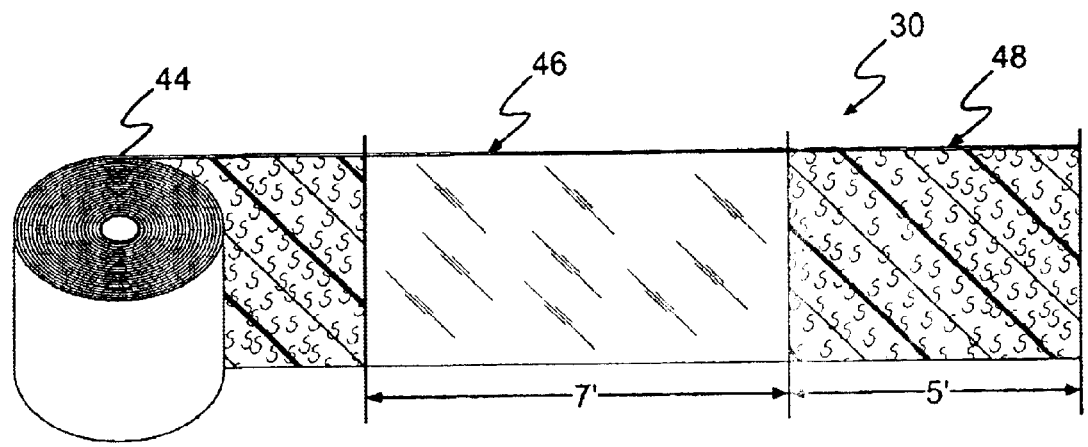
FIG. 3 is a pictorial view of the present invention showing a dispensing roll and a typical length of a monolithic, restraining strip of enhanced strength and reduced elongation under impact loading in accordance with a preferred embodiment of the invention.

Turning now to FIG. 3, the restraining strips 30 are manufactured and transported on reels or rolls 44. More particularly, a roll 44 of strips 30 are manufactured in an end-to-end continuous fashion in sequential lengths of approximately twelve feet where approximately seven feet of the strip, note segment 46, is composed of a monolithic composition in accordance with the subject invention, which will be discussed in detail below, and alternate rive foot segments 48 include an extra self-adhering component. In one embodiment the strip 30 is transversely perforated, at approximately twelve foot lengths, so that the strip is operable for self tearing or in any event can be facially cut to create a single restraining strip 30 for use on a job site. Preferably, the restraining strip 30 is fifteen inches in width; however, other widths may be substituted depending on the need for additional strength, which a wider strip can provide.

Figure 4:
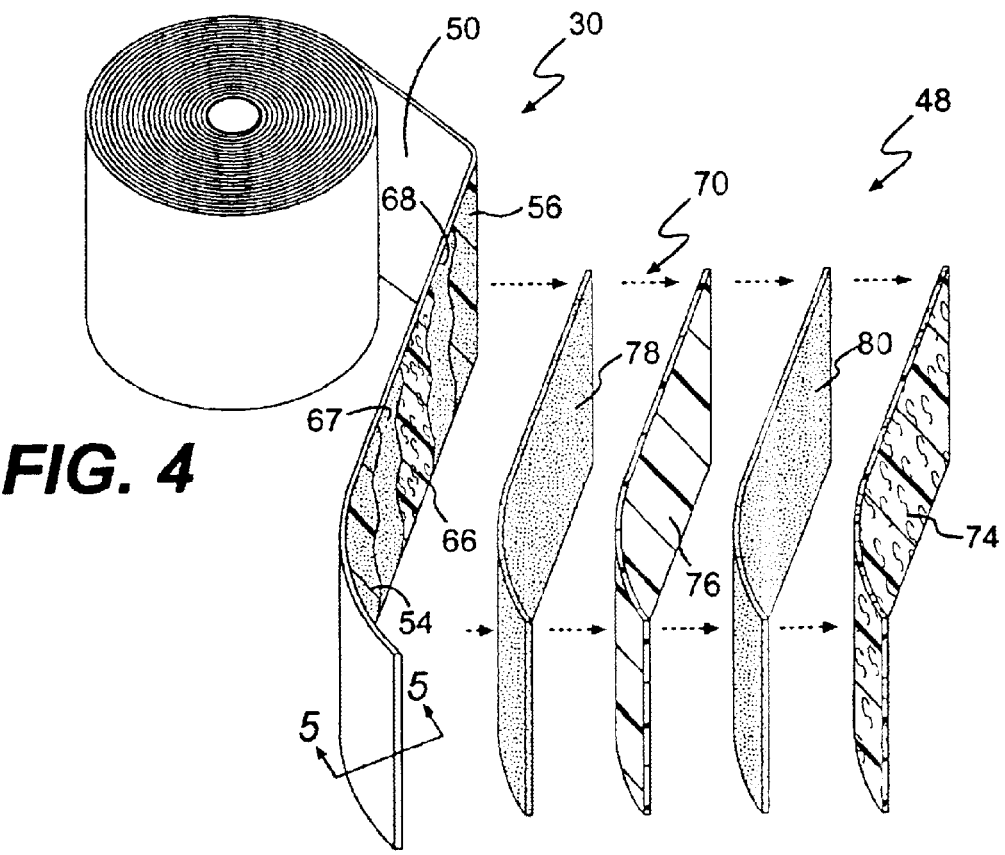
FIG. 4 is an axonometric view of a preferred embodiment of the monolithic, restraining strip as disclosed in FIG. 3 which has been partially unrolled, and broken away, to disclose detail of the strip in accordance with one preferred embodiment of the subject invention.
Figure 5:
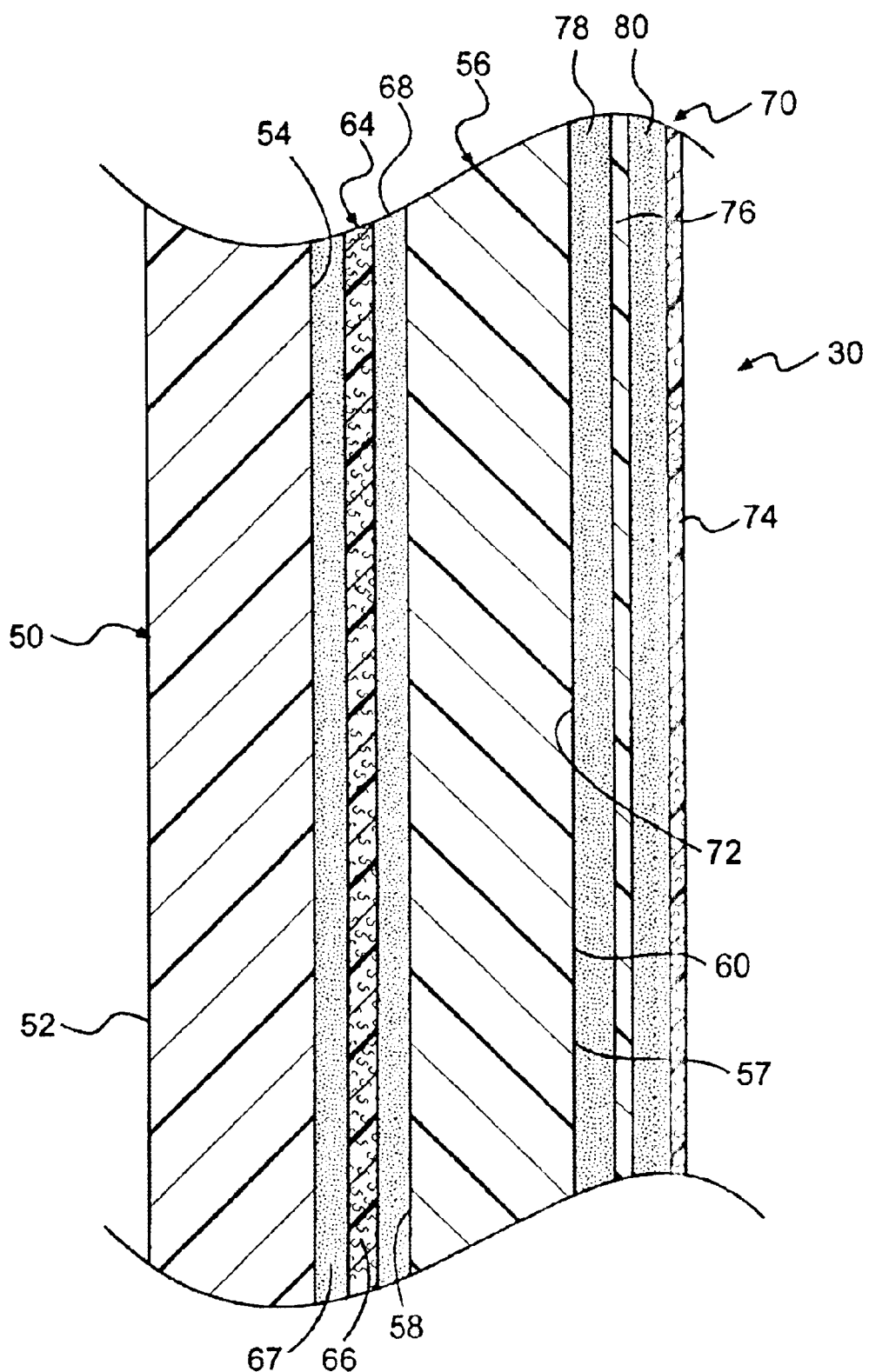
FIG. 5 depicts a partial, detailed, cross sectional view of a preferred embodiment of the monolithic restraining strip taken along section lines 5—5 in FIG. 4.

FIGS. 4 and 5 disclose one preferred embodiment of the restraining strip 30. FIG. 4 shows an expanded, partially redacted, view to disclose the relative position and components of the monolithic restraining strip 30, in accordance with the subject invention. In this, the restraining strip 30 includes a first flexible, monolithic, strip of material 50 having a first surface 52 and a second surface 54. The restraining strip 30 also comprises a second flexible, monolithic, strip of material 56 having a first surface 57 and a second surface 58. In this embodiment the two monolithic strips 50 and 56 are selected with equal thickness and composition.

The first and second monolithic strips are preferably composed of an opaque or transparent composition of high strength polypropylene, high density polyethlene or low density polyethlene, polyethleneterephtalate, polyethleneterephtalate glycol, polyvinyl chloride, vinyl chloride monomer, or cross laminated polyethylene. These materials are known to those of ordinary skill in the art and sheets of high strength characteristics are available from various high strength film manufacturing companies. As examples, polyethleneterephtalate ("PET") and polyethleneterephtalate glycol ("PETG") copolyester sheets are available as high strength extruded sheets from the Eastman Chemical Company of Kingsport, Tenn. Cross laminated polyethylene is available in a brand known as VALERON from VALERON Strength Films of Houston, Tex. Although these high strength sheet materials are presently preferred other high strength, monolithic extruded sheets of material are within the purview of the subject invention. Moreover, two or more of these materials may be combined to produce a monolithic composition.

In a preferred embodiment the monolithic sheets or strips of material 50 and 56 are joined together as an operating unit by an intermediate layer of adhesive 64. The composition of the adhesive may be chosen from a number of commercially available materials, however, a characteristic that is essential is a high shear strength since the adhesive layer 64 needs to transfer axial loading from one strip 56 of the monolithic material to the other 50 in a manner that will be discussed below.

The adhesive layer 64 may be applied directly to the inner surfaces of the monolithic sheets 50 and 56 during a manufacturing process or may be carried by a central substrate 66 which may be a porous spun bond polyester or Mylar. When a substrate 66 is used the adhesive layer 64 is divided into two portions 67 and 68 of approximately equal thickness.

The self-adhering segments 48 comprise a second layer of adhesive 70 having a first side 72 in direct self-adhering contact with an outer surface 60 of the second flexible, monolithic strip 56 as shown in FIG. 5. A release paper 74 extends over an outer most surface of the second layer of adhesive 70. The release paper 74 enables individual segments of the subject load restraining stripe to be manufactured on a reel or core, as shown in FIGS. 3 and 4, and the release paper 74 is peeled off of the individual load restraining strips 30 on site so that the second layer of adhesive 70 may be used by an installer to affix one end of the load restraining strip 30 to a side wall, or other attachment surface, of a transport container.

In a presently preferred embodiment, the second layer of adhesive 70, itself, is composed with a core or substrate member 76, a first layer of adhesive 78 and a second layer of adhesive 80 overlaying opposite sides of the substrate 76. The substrate may be a Mylar material of a more porous material to enable the adhesive layers of the second adhesive layer to bond together. In this embodiment, depicted in FIG. 5, the thickness of the first 78 and second 80 layers of adhesive are substantially the same.

Figure 6:
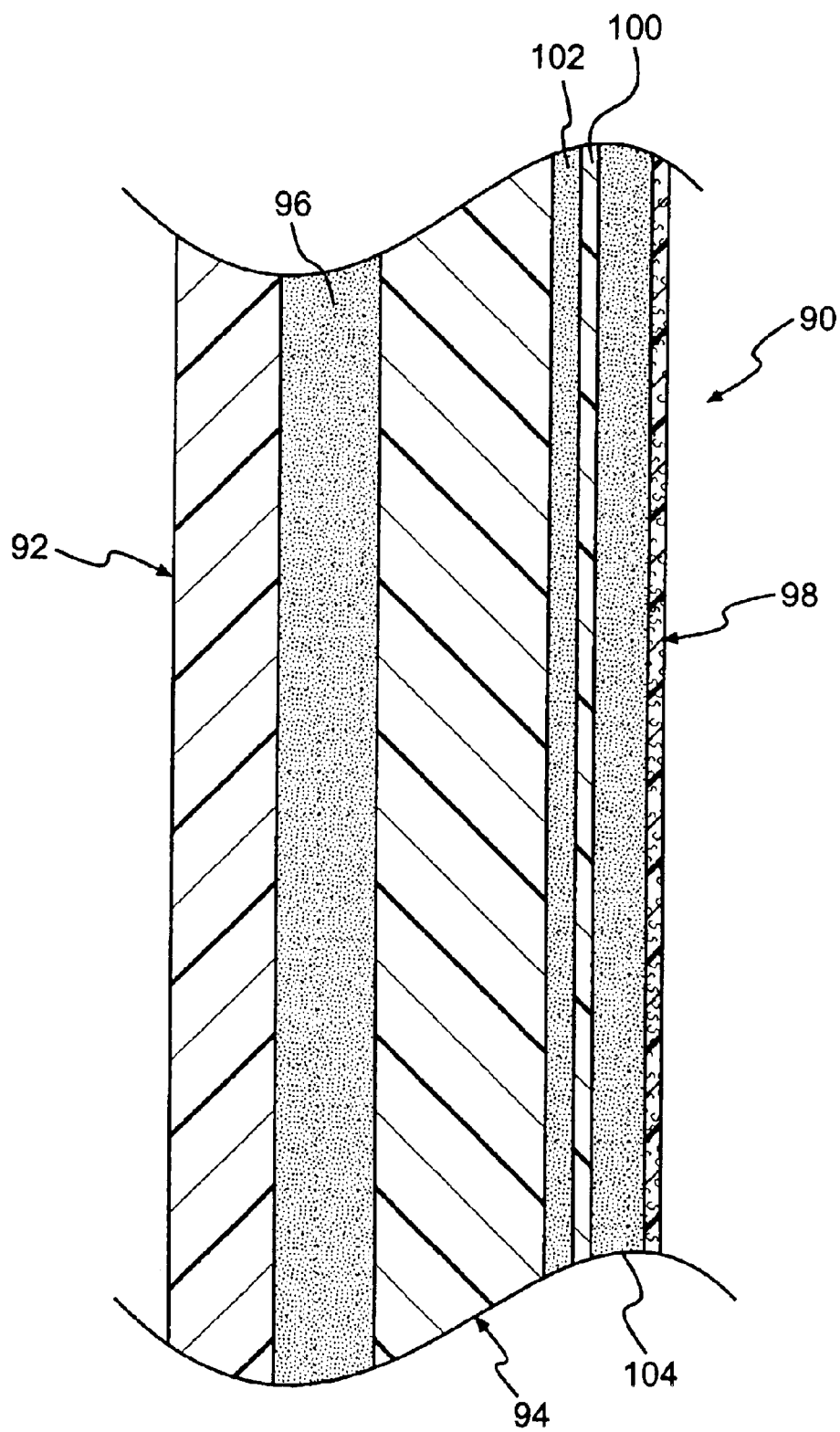
FIG. 6 is another partial, cross-sectional view, similar to FIG. 5 disclosing cross-sectional detail of another preferred embodiment of the subject invention.

Turning now to FIG. 6, there is shown an alternate preferred embodiment 90 of the subject monolithic load restraining strip invention. In this embodiment a first flexible, monolithic strip 92 is similar to previously discussed strip 50 and a second flexible, monolithic strip 94 is similar to strip 56. In this embodiment, however, the first strip 92 is thinner than the second or base strip 94. This differential thickness enables manufacture of a composite where the strip or layer that is not bonded directly to a container wall surface is reduced to; conserve on the amount of material used for the composite.

In addition, in this embodiment a layer of adhesive 96 is provided during manufacture without having an embedded substrate. Still further, in this embodiment a second layer of adhesive 98 is designed to adhere the monolithic load restraining strip 90 to an interior surface of a container is constructed with an embedded Mylar substrate 100 and a differential thickness of interior adhesive 102 and exterior adhesive 104. In this the external adhesive layer 104 which is designed to contact a relatively rough wall surface of a container is thicker than an interior adhesive layer 102 which is adhered to an outer surface of the monolithic strip 94.

The adhesive layers 70 (note again FIG. 5) and 98 (FIG. 6) are composed of compositions that have a high shear strength, wide operative temperature gradient—including cold weather tackiness and a specific gravity of less than one to displace moisture from the side walls of a container through capillary action. Adhesives of the type that are preferred are available from the Venture Tape Company of Rockland, Mass.

The subject invention is particularly designed to be used in either twenty or forty foot intermodal containers. These containers are ninety-two inches (seven feet, eight inches) wide, and ninety-two inches high. Although certain embodiments of the invention, such as depicted in FIG. 2 are adaptable to containers of all sizes, if a customer is exclusively using intermodal container having these dimensions, the adhesive from the glue line on the sidewall to the central overlapping portion would never be exposed during use. Thus, if the restraining strip is manufactured such that there is rive feet of adhesive 48 and then seven feet without extra adhesive 46, and repeating, the cost of adhesive could be reduced. However, it will be recognized by those of skill in the art that other lengths may be manufactured to meet the use objectives of a given client without departing from the concepts of the subject invention.

Method of Restraining Cargo

As more particularly described in applicant's previously noted U.S. Pat. Nos. 6,089,802 and 6,227,779 improved load restraining strips 30 and 90, as discussed above, are one component of a load restraining system as described more fully in those patents. Briefly, however, and as illustrated in connection with FIG. 2, a pair of load restraining strips 30 are cut from a roll 44. The release paper 74 is removed from strip segment 48 and the strip 30 is applied to one side wall surfaces of a container 20. A second load restraining strip 30 is also applied to a directly opposing wall surface of the container. The free ends 46 of the opposing pair of load restraining strips 30 are wound together tightly with a torque tool, again, as specifically disclosed in the prior '802 and '779 patents. An overlaying patch segment 40 is then applied over the overlapped end segments 46 and the load is operably secured.

In the subject application, and in the claims, the term 'transport container" is used as a generic expression for all forms of transport units that are capable of caring cargo. A transport container unit includes but is not limited to intermodal containers, railway cars—such as box cars, truck trailers, and the like.

Having described in detail preferred embodiments of the invention, it may be useful to briefly set forth some of the major advantages of the invention.

SUMMARY OF MAJOR ADVANTAGES OF THE INVENTION

This subject invention provides a unique, monolithic load; restraining strip, wherein extruded, monolithic strip and the shear strength of; adhesive laminations is sufficient to significantly enhance the tensile strength of the overall load restraining strip 30 and protect cargo from damage during transport.

This invention also provides an entirely self-contained monolithic, load restraint system with an outer adhesive component carried on the strip.

This invention provides an adhesive backed strip for restraining freight and cargo that has a wide operative temperature gradient so that it can withstand cargo transport through most climates.

This invention enables a monolithic load restraining strip to safely secure an entire load or even a partial load and moreover, to accomplish this without having to brace, nail, anchor, strap, or bolt, thereby substantially reducing labor costs and installation time.

This invention still further provides a flexible, monolithic product for restraining a load having enhanced sheer strength and minimum peel resistance so that, upon arrival at the destination, it may be quickly removed and disposed of without leaving a residue on a container interior wall surface.

This invention yet further provides for superior gripping and restraining due to the adhesion to interior wall or other surfaces of a container including corrugated, interior walls of an intermodal container.

This invention provides enhanced axial resistance to elongation so that it may be used in a system for transporting hazardous materials, and the like. Further the invention envisions use of differential thicknesses of the monolithic strips and adhesives to reduce the cost of materials during manufacture.

A particular advantage of the subject invention is the capability to secure full or partial loads with enhanced axial strength and resistance to elongation.

Another significant advantage of the subject invention is ability to customize the roll of polyester self-adhesive material to the needs of a particular customer.

Yet another significant advantage of the subject advantage is the strength of the barrier formed by the adhesive shear strength formed between the monolithic layers of the securement strips.

A further significant advantage of the subject invention is the ability to withstand the substantial force generated by restraining eighty, fifty-five gallon drums, double stacked, in a twenty foot long container.

In describing the invention, reference has been made to preferred embodiments. Those skilled in the art, however, and familiar with the disclosure of the subject invention, may recognize additions, deletions, substitutions, modifications and/or other changes which will fall within the purview of the invention as defined in the following claims.

What is claimed is:

1. A monolithic load restraining strip for use in securing cargo within a transport container, which cargo is subject to shifting forces during transport, said load restraint strip comprising:

a first flexible, monolithic, strip of material having a first side and a second side;

a second flexible, monolithic, strip of material having a first side and a second side;

a first layer of adhesive coextensively extending along and between said second side of said first monolithic strip and said second side of said second monolithic strip and operably serving to bond the two monolithic strips together into a load restraining unit;

a second layer of adhesive extending along and coating at least a portion of said first side of said second monolithic strip; and a release paper extending coextensively with and releasably adhered to said second layer of adhesive applied to said first side of said second monolithic strip, wherein said release paper may be removed from said second layer of adhesive on site and said load restraining strip releasably affixed by said second layer of adhesive to an interior surface of a cargo transport container such that said load restraining strip may be used as a flexible securement element to secure cargo within a transport container with the shear strength of said first layer of adhesive and said second layer of adhesive being sufficient to transfer axial loading from cargo within said cargo container to an interior surface of said container.

2. A monolithic load restraining strip for use in securing cargo within a transport container as defined in claim 1 wherein:

the thickness of said first monolithic strip is substantially equal to the thickness of said second monolithic strip and both monolithic strips are thicker than said first layer of adhesive that bonds the two monolithic strips together.

3. A monolithic load restraining strip for use in securing cargo within a transport container as defined in claim 1 wherein:

the thickness of said first monolithic strip is less than the thickness of said second monolithic strip carrying said second layer of adhesive.

4. A monolithic load restraining strip for use in securing cargo within a transport container as defined in claim 1 and further comprising:

a spun bonded polyester substrate centrally positioned within said first layer of adhesive.

5. A monolithic load restraining strip for use in securing cargo within a transport container as defined in claim 1 wherein each of said first and second monolithic strips comprises:

polypropylene.

6. A monolithic load restraining strip for use in securing cargo within a transport container as defined in claim 1 wherein each of said first and second monolithic strips comprises:

polyethylene.

7. A monolithic load restraining strip for use in securing cargo within a transport container as defined in claim 6 wherein each of said first and second monolithic strips comprises:

high density polyethylene.

8. A monolithic load restraining strip for use in securing cargo within a transport container as defined in claim 6 wherein each of said first and second monolithic strips comprises:

low density polyethylene.

9. A monolithic load restraining strip for use in securing cargo within a transport container as defined in claim 1 wherein each of said first and second monolithic strips comprises:

polyethleneterephtalate.

10. A monolithic load restraining strip for use in securing cargo within a transport container as defined in claim 1 wherein each of said first and second monolithic strips comprises:

polyethleneterephtalate glycol.

11. A monolithic load restraining strip for use in securing cargo within a transport container as defined in claim 1 wherein each of said first and second monolithic strips comprises:

polyvinyl chloride.

12. A monolithic load restraining strip for use in securing cargo within a transport container as defined in claim 1 wherein each of said first and second monolithic strips comprises:

a vinyl chloride monomer.

13. A monolithic load restraining strip for use in securing cargo within a transport container as defined in claim 1 wherein each of said first and second monolithic strips comprises:

polyethylene cross laminate.

14. A monolithic load restraining strip for use in securing cargo within a transport container as defined in claim 1 wherein each of said first and second monolithic strips comprises:

a combination of at least two components selected from the group consisting of polypropylene, polyethleneterephtalate, polyethleneterephtalate glycol, polyvinyl chloride, vinyl chloride monomer and polyethylene cross laminate.

15. A monolithic load restraining strip for use in securing cargo within a transport container as deemed in claim 1, wherein said second layer of adhesive comprises:

a substrate material;

a first course of adhesive covering a first side of said substrate material and adhered to said second side of said second monolithic layer; and a second course of adhesive covering a second side of said substrate material and being operable for adhering contact with an interior surface of a cargo transport container.

16. A monolithic load restraining strip for use in securing cargo within a transport container as defined in claim 15, wherein said substrate comprises:

a strip of mylar material.

17. A monolithic load restraining strip for use in securing cargo within a transport container as defined in claim 15, wherein: said second course of adhesive of said second layer of adhesive is thicker than said first course of adhesive of said second layer of adhesive.

18. A method for securing cargo within a transport container, which cargo is subject to shifting forces, using a monolithic load restraint system, said method comprising the steps of:

removing a first and a second monolithic load restraining strip of material, having substantially equal lengths, from a reel of monolithic strip material wherein each of said monolithic strips includes a first monolithic flexible strip of material, a second monolithic flexible strip material, a first layer of first layer of adhesive and a second layer of adhesive, said first and second monolithic load restraining strips being operable for attachment at one end to an interior surface of a transport container and the other end to extend at least partially across an unconfined end of a load to be restrained;

peeling a release paper from said second layer of adhesive from first and second monolithic load restraining strips at one of the ends thereof;

applying said first and second monolithic load restraining strips to opposing interior surfaces of the transport container so that said first and second monolithic load restraining strips extend across the transport container enough to be overlapped;

pressing the second layer of adhesive of said first and second monolithic load restraining strips against the opposing interior surfaces of the transport container;

loading cargo into the transport container;

overlapping the ends of said first and second monolithic load restraining strips that extend within the transport container;

drawing said first and second monolithic load restraining strips taut around the rear of the cargo at the overlapped location; and securing said first monolithic load restraining strip to said second monolithic load restraining strip at the overlapped portion wherein the shear strength of said first and second adhesive layers operably transfer axial loads between said first and second monolithic strips and to the interior surface of said transport container, thereby forming a secure monolithic load restraining system.

19. A method for securing cargo within a transport container, which cargo is subject to shifting forces, using a monolithic load restraint system as defined in claim 18, said method further comprising the steps of:

forming said second layer of adhesive with a substrate having a length less than the length of either of said first and second monolithic strips, a first course of adhesive on said substrate adjacent to said second layer of monolithic strip and a second course of adhesive on an outer surface of said substrate for attachment to an interior surface of said transport container.

20. A method for securing cargo within a transport container, which cargo is subject to shifting forces, using a monolithic load restraint system as defined in claim 19, said method further comprising the step of:

forming the second monolithic, flexible, strip with a thickness greater than the thickness of said first monolithic, flexible strip.

* * * * *